United States Patent [19]

Raines

[11] 4,267,411
[45] May 12, 1981

[54] PUBLIC TELEPHONE SECURITY BRACKET

[75] Inventor: Vernon R. Raines, South Houston, Tex.

[73] Assignee: Joyce Anita Raines, So. Houston, Tex. ; a part interest

[21] Appl. No.: 84,740

[22] Filed: Oct. 15, 1979

[51] Int. Cl.³ .................... H04M 1/00; H04M 17/02
[52] U.S. Cl. .................................................. 179/184
[58] Field of Search .................. 179/6.3 R, 179, 183, 179/184

[56] References Cited

U.S. PATENT DOCUMENTS

| 3,213,210 | 10/1965 | Samples | 179/6.3 R |
| 3,317,674 | 5/1967 | Nawman | 179/6.3 R |

Primary Examiner—George G. Stellar

Attorney, Agent, or Firm—Pravel, Gambrell, Hewitt, Kirk, Kimball & Dodge

[57] ABSTRACT

An anti-theft bracket adapted for attachment to the back mounting panel of a public telephone booth housing and to engage the bottom portion of a public telephone unit attached to the back mounting panel including a bottom member adapted to receive the bottom of the public telephone unit and an anti-theft bar mounted a predetermined distance from the bottom member for positioning between rows of booth mounting bolts connecting the public telephone unit to the back mounting panel, the anti-theft bar being positioned to alternately engage the rows of bolts in response to unauthorized relative movement between the public telephone unit and the booth back mounting panel.

7 Claims, 3 Drawing Figures

PUBLIC TELEPHONE SECURITY BRACKET

TECHNICAL BACKGROUND

The field of this invention relates to security brackets and in particular to security brackets to prevent theft and destruction of public telephone units.

Public telephone units have always been inviting to thieves due to the presence of coins in the telephone unit change box. In those areas in the country where the telephone rates have recently increased, such as the area where this inventor lives, the public telephone units have become even more tempting. Due to the location of public telephone units in publicly accessible areas, thieves do not generally try to break into the telephone unit coin box while in place. Rather, the thieves prefer to rip out the entire telephone unit, take it with them and remove the money from the coin box in a more secluded spot. The telephone companies suffer greatly as a result of this theft procedure. For the telephone companies not only lose the change, but the unit itself is actually destroyed or lost forever. It is therefore becoming increasingly important to somehow discourage thieves from stealing these units. Although an entirely new design for a safer, more securely mounted public telephone unit or booth is possible, the telephone companies already have a tremendous investment in the present design, making the need for a safety device that may be used in conjunction with presently installed units a necessity. This type of vandalism not only hurts the telephone companies, but also the public since the cost of this vandalism is passed directly on to others.

SUMMARY OF THE INVENTION

This invention is directed to an anti-theft bracket adapted for attachment to the back mounting panel of a public telephone booth housing and to secure the bottom portion of a public telephone unit attached to the back mounting panel in order to prevent a thief from easily tearing the public telephone unit off of the back mounting panel. The anti-theft bracket includes an anti-theft bar which is critically positioned between the public telephone booth back mounting panel and the unit itself to engage an upper or lower row of booth mounting bolts in response to exertion of force and movement against the public telephone unit to thereby lock the unit against any further movement and thus secure the unit to keep it from being ripped out.

The detailed features of the anti-theft bracket will be described in the written specification to follow, and the invention considered patentable will be set forth in the claims.

DESCRIPTION OF THE PREFERRED EMBODIMENT

Figure 1:
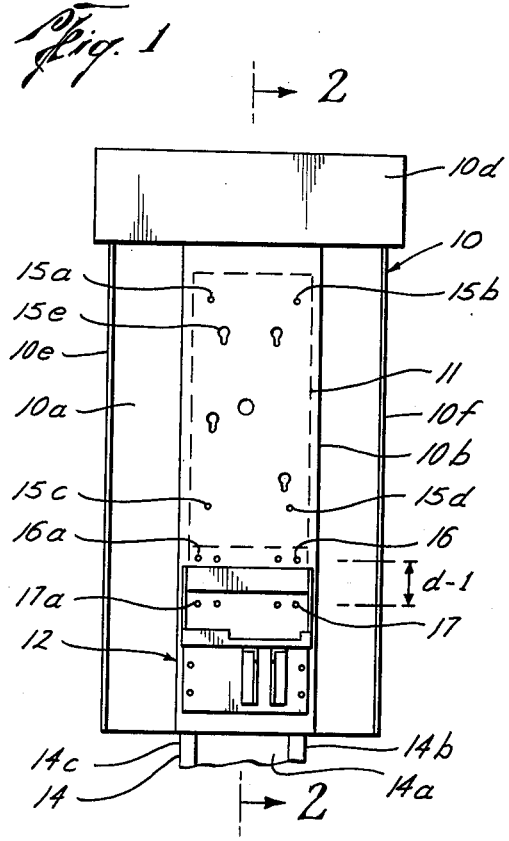
FIG. 1 is a front view of a free-standing public telephone booth housing and the anti-theft bracket of this invention, the public telephone unit being shown in dotted lines.
Figure 2:
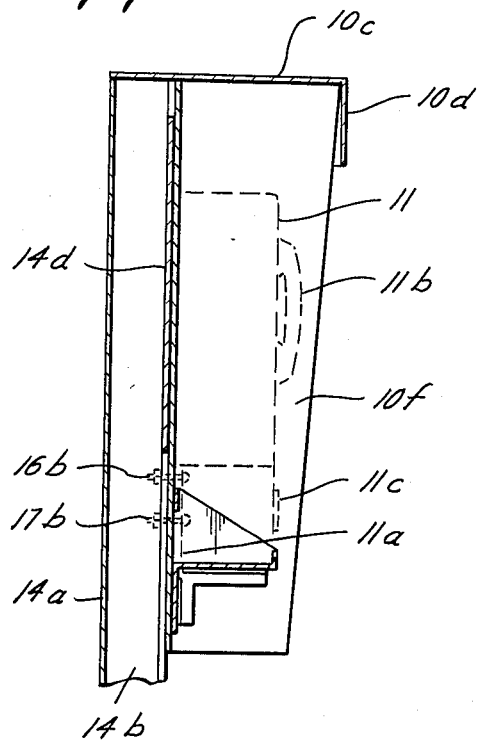
FIG. 2 is a side view of FIG. 1.
Figure 3:
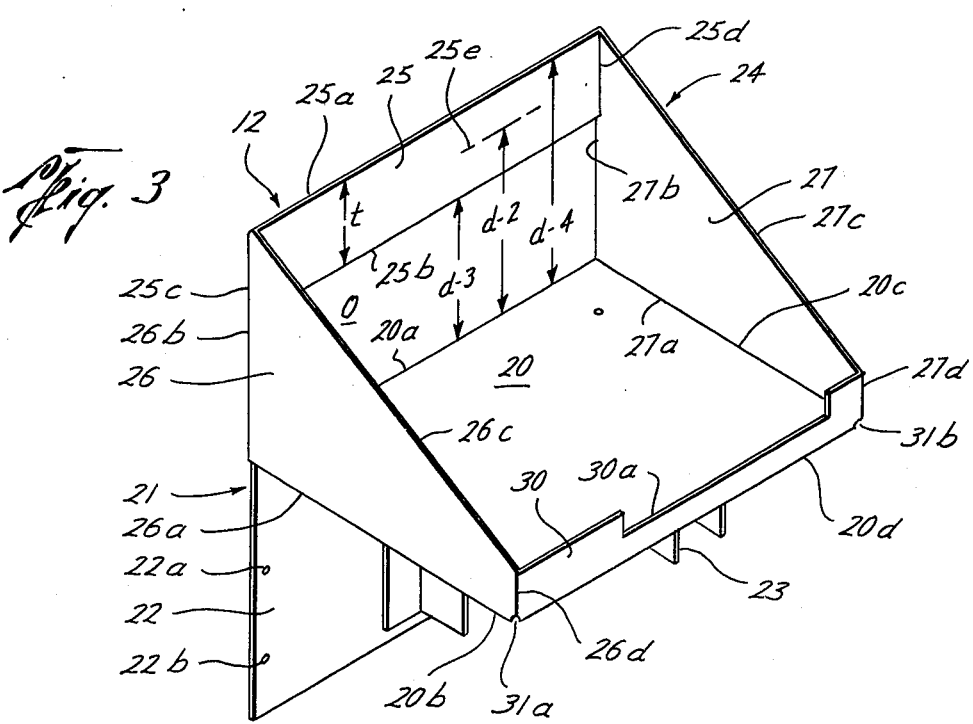
FIG. 3 is an isometric view of the anti-theft bracket of the preferred embodiment of this invention.

Referring to the drawings, FIGS. 1 and 2 illustrate a free-standing public telephone booth housing generally designated by the number 10. The free-standing public telephone booth housing has mounted thereon a public telephone unit 11, which is shown in dotted lines for the purposes of clarity. An anti-theft bracket, generally designated by the number 12, is adapted to be mounted between the public telephone booth housing 10 and the public telephone unit 11 in order to aid in the prevention of the public telephone unit 11 being torn out of the booth housing 10 by a thief.

The free-standing housing 10 includes a U-shaped stand or pole 14 which is formed of a back member 14a and side members 14b and 14c. A steel insert 14d, shown in cross-section in FIG. 2, is mounted by screws or otherwise to extend between side members 14b and 14c. The public telephone booth housing 10 further includes a back member 10a having a U-shaped back mounting panel 10b formed therewith. The U-shaped back mounting panel 10b is adapted to be fitted over the front, open portion of the stand 14 including the steel insert 14d, and to be attached thereto by suitable mounting bolts or screws (not shown) which fasten through openings in the steel insert 14d, in the back mounting panel, numbered 15a–d, and in the rear wall of the telephone unit 11.

The public telephone booth housing 10 further includes a top 10c and a downwardly depending hooded front piece 10d, the hooded front piece fitting over housing side pieces 10e and 10f. The side pieces 10e and 10f cooperate with the back member 10a and top 10c to provide a partially protected enclosure which protects the telephone unit 11 and a user from at least some wind and rain.

Referring to FIG. 1, the back mounting panel 10b typically includes a number of key slots such as 15e as well as mounting holes such as 15a–d adapted to receive and mount the telephone unit 11. The back mounting panel 10b further includes a first horizontal row 16 of openings such as 16a and a second horizontal row 17 of openings such as 17a which are spaced from each other a distance designated as d-1. Rows 16 and 17 are adapted to receive bolts such as 16b and 17b shown in hidden lines in FIG. 2 which extend through the back wall 11a of the public telephone unit 11 in order to mount the public telephone unit 11 against the back mounting panel 10b.

The public telephone unit 11 is a well-known piece of equipment undoubtedly used at some time by any reader of this specification and includes the instrument 11b and coin slots (not shown) typically mounted with the unit above the resting position for the instrument 11b. A change or coin box, illustrated in dash lines and identified as 11c, is typically mounted in the bottom part of the unit 11 and may be removed by a key. The bolts 16b and 17b actually extend through rear wall 11a of the telephone unit 11 positioned behind the change box 11c and through back mounting panel 10b and steel insert 14d.

Typically, an authorized person from a phone company periodically removes and empties the change box 11c. The lock for the change box 11c is sufficiently strong that the usual thief does not have the tools nor expertise to tear open the change box 11c quickly and thus has to tear off the entire unit 11 and remove it to a hidden location to have time to break open the change box 11c.

The anti-theft bracket 12 of the preferred embodiment of this invention is designed to mount with the public telephone booth housing 10 and with the public telephone unit 11 to prevent the thief from easily tearing the telephone unit 11 out.

The anti-theft bracket 12 of the preferred embodiment of this invention includes a bottom plate or member 20 adapted to extend horizontally outwardly from the back mounting panel 10b of the public telephone booth housing 10. The bottom plate 20 is adapted to receive the bottom portion of the public telephone unit 11 and thus has approximately the same rectangular dimensions as the bottom of the public telephone unit 11.

Bracket mount means generally designated by the number 21 is attached to the bottom plate 20 and depends downwardly therefrom for attachment to the telephone booth housing back mounting plate 10b in order to attach the anti-theft bracket 12 to the housing 10. The bracket mount means 21 includes a depending back member 22 which is welded onto rear edge 20a of the bottom plate 20 and extends vertically downwardly therefrom for positioning directly against the back mounting panel 10b. The depending back member 22 includes a plurality of openings such as 22a and 22b positioned to align with additional openings in the telephone booth housing back mounting panel 10b for attachment thereto by suitable screws or bolts. One or more gussets 23 are welded onto the bottom face of the bottom plate 20 and onto the depending back member 22 in order to provide support to hold the depending back member 22 and bottom plate 20 in a right angle relationship. In the embodiment illustrated, the gussets 23 are L-shaped but, the gussets may have other suitable supporting configurations.

Bar mount means generally designated by the number 24 mounts anti-theft bar 25 a predetermined distance d-2 from the bottom plate 20 for positioning the anti-theft bar 25 between rows 16 and 17 of openings which receive booth mounting bolts such as 16b and 17b. The bar mount means 24 includes left side member 26 and right side member 27, both of which are generally triangular in configuration. The left side member 26 includes bottom edge 26a which is welded onto the left edge 20b of the bottom plate 20, a rear, vertical edge 26b, an inclined edge 26c and front shoulder edge 26d. Similarly, the right side member 27 includes bottom edge 27a welded or otherwise attached to right edge 20c of bottom plate 20, vertical rear edge 27b, inclined top edge 27c and front shoulder edge 27d.

The anti-theft bar 25 is substantially rectangular in configuration and extends lengthwise between the top portions of rear edges 26b and 27b of the side members 26 and 27. The anti-theft bar 25 has a rectangular configuration and includes top edge 25a, bottom edge 25b and side edges 25c and 25d. The anti-theft bar 25 is welded at sides 25c and 25d to the top portions of the rear side member edges 26b and 27b, respectively.

The anti-theft bar 25 is positioned a predetermined distance d-2 between the bottom plate 20 and bar midline 25e. The thickness t of the anti-theft bar 25 is sufficient that the bottom edge 25b is positioned a distance d-3 from the bottom plate 20. And, the top anti-theft bar edge 25a is positioned a distance defined as d-4 from the bottom plate 20. Thus, the thickness or height t of the anti-theft bar 25 is less than the distance d-1 between rows 16 and 17 of openings such as 16a and 17a. The bottom edge 25b of the anti-theft bar 25 cooperates with side members 26 and 27 and bottom plate 20 to form an opening O to receive bolts or screws to be mounted in row 17 of openings.

The anti-theft bracket 12 further includes a front, security lip or rim 30 which is welded to front bottom plate edge 20d and to the front shoulders 26d and 27d of the supporting side members 26 and 27, respectively. The front security rim 30 includes a vertically recessed portion 30a adapted to be positioned under the phone unit coin box 11c in order to allow the change box 11c to be easily removed by a representative of the phone company.

The L-shaped gussets such as 23 are mounted directly underneath the vertically recessed security rim portion 30a in order to provide additional support to the safety rim 30 in the area under the coin box 11c.

Corner openings 31a and 31b are drilled through corner portions of the side members 26 and 27, bottom plate 20 and front security rim 30 to provide drainage.

In operation and use, the anti-theft bracket 12 of the preferred embodiment of this invention may be used to help prevent a thief from easily ripping the phone unit 11 off of a public telephone booth housing, such as the free-standing housing 10 illustrated in FIGS. 1 and 2. It should be understood that the anti-theft bracket 12 may be utilized with other phone booth housings such as a housing mounted directly onto a wall. In use with the free-standing housing 10 illustrated in FIGS. 1 and 2, the anti-theft bracket 12 is positioned against the back mounting panel 10b, and suitable bolts or screws are mounted through openings such as 22a and 22b in the depending back member 22 to thereby firmly attach the anti-theft bracket 12 to the back mounting panel 10b.

The phone unit 11 is then installed with bolts 16b and 17b extending through each of the openings 16a and 17a in rows 16 and 17 in back mounting panel 10b, positioned on either side of the anti-theft bar 25. Of course, the other points of connection such as openings 15a–d and key slots 15e are also utilized to firmly mount the phone unit 11 to the back mounting panel 10b. The phone unit 11 is positioned such that the bottom of the phone unit 11 is resting on the bottom plate 20 and the bottom portion of the phone unit 11 is confined by side members 26 and 27 and the front security rim 30.

Should a thief attempt to place a lever such as a crowbar between the security rim 30 and the bottom part of the phone unit 11 and push upwardly on the phone unit 11, the bolts such as 17b in row 17 will be forced against bottom edge 25b of the anti-theft bar 25 thus preventing further movement of the unit 11 relative to the anti-theft bracket 12, thus locking the phone unit against removal. Conversely, should the thief try somehow to push downwardly on the phone unit 11, such as by applying lever action to the top of the phone unit 11, mounting bolts 16b in row 16 will be forced downwardly against top anti-theft bar edge 25a thus preventing further movement of the phone unit 11. Furthermore, the cooperation between back plate 20 and depending member 22, will prevent a thief from getting a lever such as a crowbar between the bottom of the phone unit 11 and the back mounting panel 10b of housing 10. In this manner, the edges 25a and 25b of the anti-theft bar 25 cooperate with the booth mounting bolts 16b and 17b to secure the unit 11 against further movement relative to back mounting panel 10b.

While the safety mounting bracket will not in all cases prevent the phone unit 11 being torn off of the back mounting panel 10b, it will certainly discourage a thief by slowing him down to the point that it is unlikely that the thief will feel comfortable taking the needed time to rip the telephone unit 11 out, since the thief may very well be reported to the police by any passerby.

The foregoing disclosure and description of the invention are illustrative and explanatory thereof, and various changes in the size, shape and materials as well as in the details of the illustrated construction may be made without departing from the spirit of the invention.

I claim:

1. An anti-theft bracket adapted for attachment to the back mounting panel for a public telephone booth housing and to engage the bottom portion of a public telephone unit attached to such back mounting panel, comprising:
    a bottom member adapted to receive the bottom of a public telephone unit;
    bracket mount means attached with said bottom member and depending downwardly from said bottom member for mounting said anti-theft bracket to the back mounting panel of a public telephone booth housing; and
    an anti-theft bar and bar mount means mounting said anti-theft bar a predetermined distance from said bottom member for positioning between such back mounting panel of such public telephone booth housing and a public telephone unit in between spaced rows of booth mounting bolts which extend through such public telephone unit and such mounting panel so that one of said rows of mounting bolts is engaged by such anti-theft bar in response to unauthorized relative movement between said bottom member and such public telephone unit.

2. The structure set forth in claim 1, wherein said bracket mount means includes:
    a depending back member attached to and depending downwardly from said bottom member; and
    said depending back member having openings to receive bracket mounting bolts for attaching said depending back member to such back mounting panel of such public telephone booth housing.

3. The structure set forth in claim 2, including:
    a gusset member attached to said depending back member and said bottom member directly below the location of the change box of such public telephone unit.

4. The structure set forth in claim 1 or 2, wherein said bar mount means includes:
    side members extending upwardly from said bottom member; and
    said anti-theft bar being attached between said side members a predetermined distance from said bottom member to create an opening to receive one of such rows of booth mounting bolts and having a bottom edge adapted to engage the lower row of such booth mounting bolts in the event of theft attempts.

5. The structure set forth in claim 4, including:
    said anti-theft bar being sufficiently wide to have a top edge adapted to engage the upper row of such booth mounting bolts in the event of theft attempts.

6. The structure set forth in claim 4, including:
    a front security lip mounted with and extending upwardly from said bottom member, said front security lip being attached to said side members, said front security lip being positioned to extend upwardly over a part of such public telephone unit to prevent an intruder from getting a lever object under the public phone unit.

7. The structure set forth in claim 6, including:
    said bracket mount means including a depending back member attached to and depending downwardly from said bottom member, said depending back member having openings to receive bracket mounting bolts for attaching said depending back member to such back mounting panel of such public telephone booth housing;
    said front security lip including a vertically recessed portion adapted to be positioned under the change box on such public telephone unit to allow legal access for emptying the change box; and
    a gusset member attached to said depending back member and to said bottom member directly below said vertically recessed portion of said front security lip in order to provide additional support to the public telephone unit in the area of the change box.

* * * * *